United States Patent
Kim

(10) Patent No.: US 9,732,656 B2
(45) Date of Patent: Aug. 15, 2017

(54) METHOD FOR REGENERATING EXHAUST GAS FILTER FOR VEHICLES AND SYSTEM THEREFOR

(71) Applicants: HYUNDAI MOTOR COMPANY, Seoul (KR); KIA MOTORS CORPORATION, Seoul (KR)

(72) Inventor: Beom Kyu Kim, Yeosu-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/944,107

(22) Filed: Nov. 17, 2015

(65) Prior Publication Data

US 2017/0022872 A1     Jan. 26, 2017

(30) Foreign Application Priority Data

Jul. 23, 2015 (KR) .................... 10-2015-0104656

(51) Int. Cl.
    *F01N 3/023*     (2006.01)
    *F01N 9/00*     (2006.01)
    *F02D 41/02*     (2006.01)
    *F02D 41/14*     (2006.01)
    (Continued)

(52) U.S. Cl.
CPC .............. *F01N 9/002* (2013.01); *F01N 3/023* (2013.01); *F02D 31/001* (2013.01); *F02D 41/029* (2013.01); *F02D 41/1446* (2013.01); *F01N 2430/00* (2013.01); *F01N 2560/06* (2013.01); *F02D 41/08* (2013.01)

(58) Field of Classification Search
CPC ........ F01N 3/023–3/0296; F01N 9/002; F01N 2430/00–2430/10
See application file for complete search history.

(56) References Cited

U.S. PATENT DOCUMENTS

2003/0217549 A1* 11/2003 Watanabe .............. F01N 3/0231 60/285
2007/0193258 A1* 8/2007 Berke .................... F01N 9/002 60/297

FOREIGN PATENT DOCUMENTS

| JP | 2005-120872 A | 5/2005 |
| JP | 2006-029239 A | 2/2006 |
| JP | 2011-256843 A | 12/2011 |

(Continued)

OTHER PUBLICATIONS

Korean Office Action dated Dec. 21, 2016, issued in Korean patent application No. 10-2015-0104656.

*Primary Examiner* — Jonathan Matthias

(74) *Attorney, Agent, or Firm* — McDermott Will & Emery LLP

(57) ABSTRACT

A method for regenerating an exhaust gas filter for vehicles includes controlling an engine to operate in a high RPM range by a controller and regenerating the exhaust gas filter, controlling the engine to operate in the high RPM range by a temperature sensor unit provided on an exhaust pipe, controlling the engine to operate in a middle RPM range above a measured exhaust gas temperature threshold, and controlling the engine to operate in the middle RPM range by the temperature sensor unit, and controlling the engine to operate in an idle state if the temperature of the exhaust gas measured by the temperature sensor unit in secondary measurement is a middle RPM escape temperature predetermined by the controller or lower.

9 Claims, 2 Drawing Sheets

(51) Int. Cl.
*F02D 31/00* (2006.01)
*F02D 41/08* (2006.01)

(56) References Cited

FOREIGN PATENT DOCUMENTS

| | | |
|---|---|---|
| KR | 10-0398151 B1 | 9/2003 |
| KR | 10-2004-0060715 A | 7/2004 |
| KR | 10-2008-0001867 A | 1/2008 |
| KR | 10-1529449 B1 | 6/2015 |

* cited by examiner

METHOD FOR REGENERATING EXHAUST GAS FILTER FOR VEHICLES AND SYSTEM THEREFOR

CROSS-REFERENCE TO RELATED APPLICATION

This application claims the benefit of priority to Korean Patent Application No. 10-2015-0104656, filed on Jul. 23, 2015 with the Korean Intellectual Property Office, the disclosure of which is incorporated herein by reference.

TECHNICAL FIELD

The present disclosure relates to a method for regenerating an exhaust gas filter for vehicles which prevents heat damage to the filter due to a temperature rise of exhaust gas and improves reliability of regeneration of the filter, and a system therefor.

BACKGROUND

In general, an exhaust gas filter refers to an exhaust gas after-treatment device to remove environmentally harmful substances from exhaust gas exhausted from an engine of a vehicle. Particularly, a diesel engine generates a large amount of fine dust due to nitrogen oxides and oxidation of carbon, as compared to a gasoline engine, and various devices to remove such dust are provided.

Particularly, in a diesel engine, foreign substances having fine particles, such as fine dust, generate smoke and are internationally subject to regulations. Therefore, an exhaust gas filter to remove such fine dust may be provided and, as a usage period of the exhaust gas filter increases, the amount of foreign substances collected in the filter increases and lowers the performance of the filter.

In order to solve lowering of the performance of the filter, a method of regenerating a filter by removing foreign substances having fine particles collected in the filter using exhaust gas of a high temperature generated when an engine is operated at a high RPM is used. In addition, many enterprises have tried to develop filter regeneration methods.

In connection with the above method, reference may be made to Korean Patent Registration No. 10-0398151 entitled "Auxiliary air supplying device for improving DPF purification rate and purification method".

However, in the method for regenerating a filter by removing foreign substances having fine particles collected in the filter using exhaust gas of a high temperature generated when an engine is rotated at a high RPM, if the engine returns to a low RPM after regeneration of the filter has been completed, the amount of exhaust gas decreases, engine cooling effects are reduced, and the concentration of oxygen in the exhaust gas increases and reacts with remaining fuel in an exhaust pipe, thus continuously increasing the temperature of the exhaust gas and causing heat damage to the filter.

The above description has been made only for a better understanding of the background of the disclosure but it is understood by those skilled in the art that it corresponds to known technology.

SUMMARY OF THE DISCLOSURE

Therefore, the present disclosure has been made in view of the above problems, and it is an object of the present disclosure to provide a method for regenerating an exhaust gas filter for vehicles which prevents heat damage to the filter due to temperature rise of exhaust gas and improves reliability of regeneration of the filter, and a system therefor.

In accordance with an aspect of the present disclosure, the above and other objects can be accomplished by the provision of a method for regenerating an exhaust gas filter for vehicles, including controlling an engine to operate in a high RPM range by a controller and regenerating the exhaust gas filter due to temperature rise of exhaust gas, primarily measuring the temperature of the exhaust gas in control of the engine to operate in the high RPM range by a temperature sensor unit provided on an exhaust pipe, controlling the engine to operate in a middle RPM range by the controller to prevent the exhaust gas from overheating and oxygen from reaching an excessively high concentration, if the temperature of the exhaust gas measured by the temperature sensor unit in primary measurement is a high RPM escape temperature predetermined by the controller or higher, secondarily measuring the temperature of the exhaust gas in control of the engine to operate in the middle RPM range by the temperature sensor unit, and controlling the engine to operate in an idle state, if the temperature of the exhaust gas measured by the temperature sensor unit in secondary measurement is a middle RPM escape temperature predetermined by the controller or lower.

In secondary measurement, the controller may measure a maintenance time of control of the engine to operate in the middle RPM range and the temperature sensor unit may measure the temperature of the exhaust gas.

In control of the engine to operate in the idle state, if the temperature of the exhaust gas measured by the temperature sensor unit in secondary measurement is the middle RPM escape temperature predetermined by the controller or lower and the maintenance time of control of the engine to operate in the middle RPM range measured by the controller is a middle RPM escape time predetermined by the controller or more, the controller may control the engine to operate in the idle state.

The high RPM range of the engine may be the range of 1,200 RPM~1,500 RPM.

The middle RPM range of the engine may be the range of 650 RPM~1,200 RPM.

In control of the engine to operate in the high RPM range, a fuel injection device provided on an exhaust pipe between the exhaust gas filter and the engine may inject fuel into the exhaust pipe to raise the temperature of the exhaust gas.

In primary measurement and secondary measurement, the temperature sensor unit provided on an exhaust pipe between the fuel injection device and the exhaust gas filter may measure the temperature of the exhaust gas.

In accordance with another aspect of the present disclosure, there is provided a method regenerating an exhaust gas filter for vehicles, including controlling an engine to operate in a high RPM range and regenerating the exhaust gas filter due to temperature rise of exhaust gas, primarily measuring the temperature of the exhaust gas in control of the engine to operate in the high RPM range, controlling the engine to operate in a middle RPM range to prevent the exhaust gas from overheating and oxygen from reaching an excessively high concentration, if the temperature of the exhaust gas measured in primary measurement is a high RPM escape temperature or higher, secondarily measuring the temperature of the exhaust gas in control of the engine to operate in the middle RPM range, and controlling the engine to operate in an idle state, if the temperature of the exhaust gas measured in secondary measurement is a middle RPM escape temperature or lower.

In accordance with a further aspect of the present disclosure, there is provided a system for regenerating an exhaust gas filter for vehicles, including a temperature sensor unit provided on an exhaust pipe between a vehicle engine and the exhaust gas filter to measure the temperature of exhaust gas, and a controller configured to control the engine to operate in a high RPM range and to regenerate the exhaust gas filter due to temperature rise of the exhaust gas, to control the engine to operate in a middle RPM range to prevent the exhaust gas from overheating and oxygen from reaching an excessively high concentration if the temperature of the exhaust gas in the high RPM range is a high RPM escape temperature or higher, and to control the engine to operate in an idle state if the temperature of the exhaust gas in the middle RPM range is a middle RPM escape temperature or lower.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
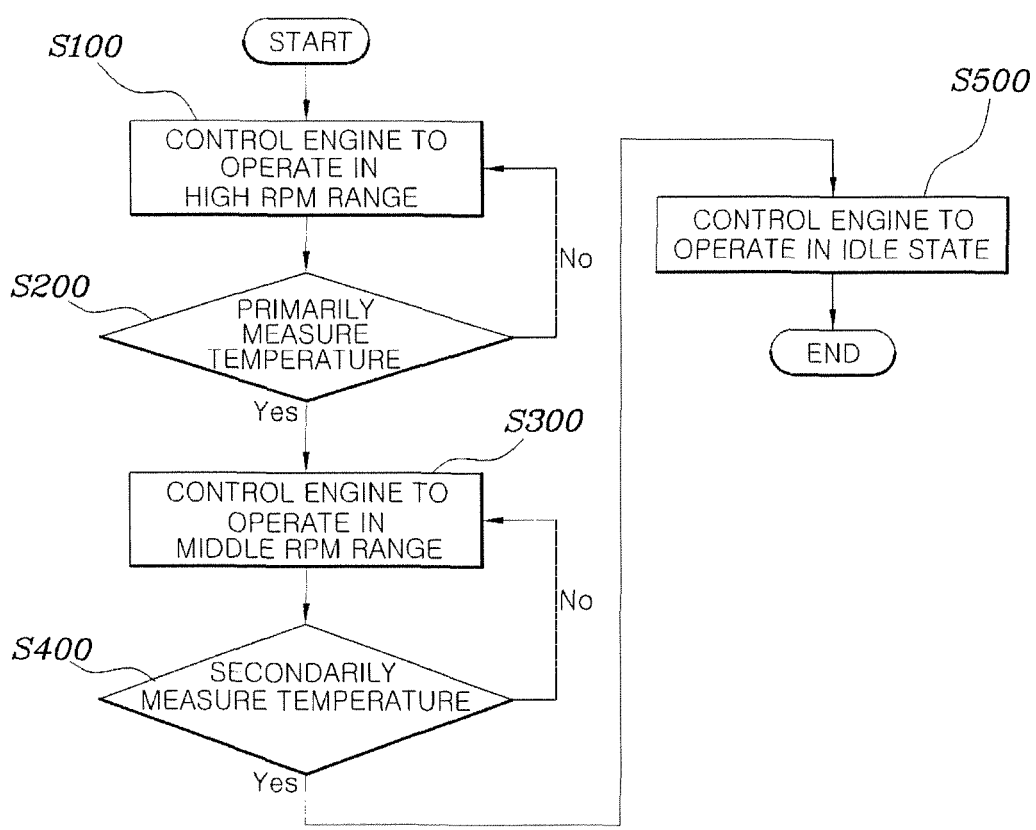
FIG. 1 is a flowchart illustrating a method for regenerating an exhaust gas filter for vehicles in accordance with one embodiment of the present disclosure.
Figure 2:
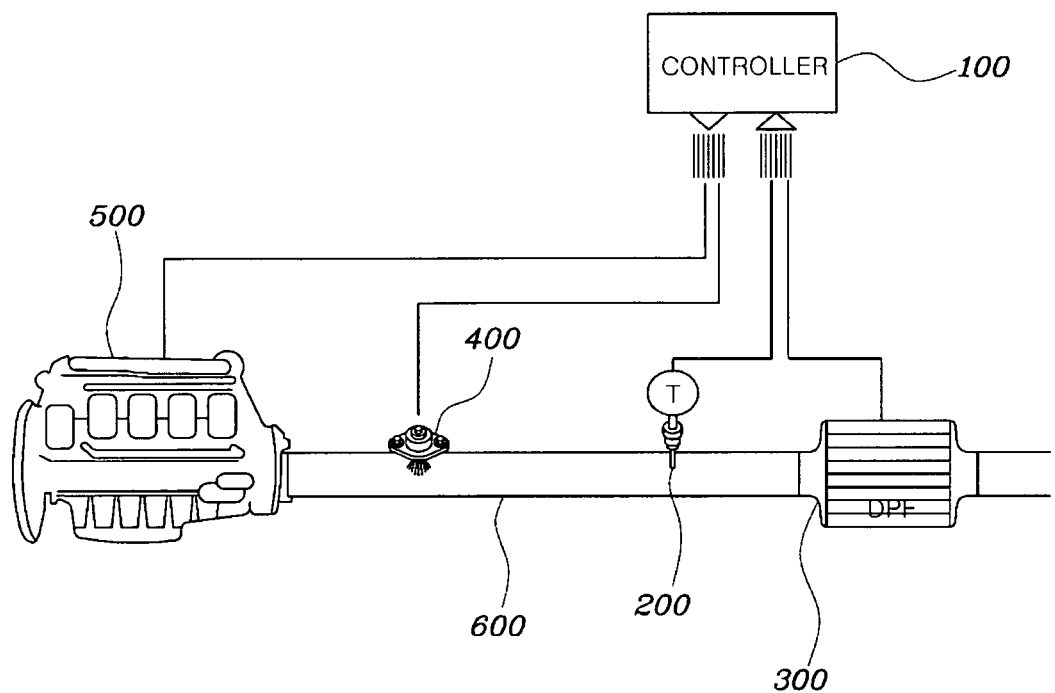
FIG. 2 is a view illustrating a system for regenerating an exhaust gas filter for vehicles in accordance with one embodiment of the present disclosure.

FIG. 1 is a flowchart illustrating a method for regenerating an exhaust gas filter 300 for vehicles in accordance with one embodiment of the present disclosure and FIG. 2 is a view illustrating a system for regenerating an exhaust gas filter 300 for vehicles in accordance with one embodiment of the present disclosure.

The present disclosure may be simply and effectively used to prevent heat damage to an exhaust gas filter due to temperature rise of exhaust gas and to improve reliability of regeneration of the exhaust gas filter.

As exemplarily shown in FIG. 1, the method for regenerating an exhaust gas filter 300 for vehicles in accordance with the present disclosure may include controlling an engine 500 to operate in a high RPM range by a controller 100 and regenerating an exhaust gas filter 300 due to temperature rise of exhaust gas (Operation S100), primarily measuring the temperature of the exhaust gas to control the engine 500 to operate in the high RPM range (Operation S100) by a temperature sensor unit 200 provided on an exhaust pipe (Operation S200), controlling the engine 500 to operate in a middle RPM range by the controller 100 to prevent the exhaust gas from overheating and oxygen from reaching an excessively high concentration, if the temperature of the exhaust gas measured by the temperature sensor unit 200 in primary measurement (Operation S200) is a high RPM escape temperature predetermined by the controller 110 or higher (Operation S300), secondarily measuring the temperature of the exhaust gas to control the engine 500 to operate in the middle RPM range (Operation S300) by the temperature sensor unit 200 (Operation S400), and controlling the engine 500 to operate in an idle state, if the temperature of the exhaust gas measured by the temperature sensor unit 200 in secondary measurement (Operation S400) is a middle RPM escape temperature predetermined by the controller 110 or lower (Operation S500).

In more detail, in controlling the engine 500 to operate in the high RPM range (Operation S100), the controller 100 controls the engine 500 to operate in the high RPM range and, thus, the temperature of exhaust gas is raised and the exhaust gas filter 300 may be regenerated.

The controller 100 may be an ECU of a vehicle or may be a control unit provided separately from the ECU. The controller 100 is connected to a control area of the engine 500 and controls the engine 500 to operate at predetermined RPM.

When the RPM of the engine 500 increases, the amount of fuel consumed by the engine 500 increases and a quantity of generated heat increases. Thereby, the temperature of the exhaust gas is raised and reaches a temperature at which foreign substances collected in the exhaust gas filter 300 may be naturally combusted so as to be removed from the exhaust gas filter 300.

Further, as exemplarily shown in FIG. 1, in primary measurement (Operation S200) of the present disclosure, the temperature sensor unit 200 provided on the exhaust pipe may measure the temperature of the exhaust gas to control the engine 500 to operate in the high RPM range (Operation S100).

The temperature sensor unit 200 may be installed at any one point of exhaust gas flow paths and is preferably installed on an exhaust pipe located between the engine 500 and the exhaust gas filter 300. If the temperature sensor unit 200 is installed excessively close to the engine 500, the temperature of the exhaust gas may not be accurately measured due to interference of heat energy caused by fuel combustion of the engine 500.

Accordingly, the controller 100 determines whether or not the temperature of the exhaust gas measured by the temperature sensor unit 200 corresponds to a high RPM escape temperature predetermined by the controller 100 and continues to execute control of the engine 500 to operate in the high RPM range (Operation S100) under the condition that the measured temperature of the exhaust gas does not reach the high RPM escape temperature, thus adjusting reach of the temperature of the exhaust gas to a target temperature.

Further, as exemplarily shown in FIG. 1, in controlling the engine 500 to operate in the middle RPM range (Operation S300) of the present disclosure, if the temperature of the exhaust gas measured by the temperature sensor unit 200 in primary measurement (Operation S200) is a high RPM escape temperature or higher, the controller 100 controls the engine 500 to operate in a middle RPM range to prevent the exhaust gas from overheating and oxygen from reaching an excessively high concentration.

The high RPM escape temperature is preferably set to a temperature at which the foreign substances collected in the exhaust gas filter 300 may be naturally combusted and set to a temperature lower than a temperature at which heat damage may be applied to a material of the exhaust gas filter 300.

When the temperature of the exhaust gas is raised by high RPM operation of the engine 500 and exceeds the temperature at which foreign substances collected in the exhaust gas filter 300 may be naturally combusted, the exhaust gas reaches a temperature at which the material of the exhaust gas filter 300 may be damaged by heat and the exhaust gas filter 300 is damaged such that performance of the filter 300 is lowered or lost.

If the engine 500 transitions from the high RPM range directly to the idle state, the quantity of intake air maintained in the high RPM range is continuously maintained for a designated time and air is sucked into the engine 500 at such a quantity of intake air. Further, the quantity of fuel injected into the engine 500 is rapidly reduced, oxygen consumption is reduced and, thus, an oxygen concentration in exhaust gas is rapidly increased.

As the quantity of air exhausted from the engine 500 reaching the idle state is rapidly reduced, the quantity of air flowing in the engine 500 is reduced and, thus, engine cooling effects are reduced, and a part of the exhaust gas of a high temperature generated the engine 500 during control of the engine 500 to operate in the high RPM range (Operation S100) remains and thus exhaust gas in the idle state maintains a high temperature at an initial stage.

In addition, remaining fuel, which is not completely combusted in the engine 500 and is exhausted together with exhaust gas from the engine 500, is present in the exhaust pipe along which the exhaust gas flows to the filter 300. As the exhaust gas having an excessively high concentration of oxygen and a high temperature passes through the exhaust pipe, the exhaust gas reacts with the remaining fuel in the exhaust pipe and is thus overheated.

Therefore, at a moment when the engine 500 transitions from the high RPM range to the idle state, exhaust gas flowing in the exhaust pipe is raised to a temperature which may cause heat damage to the filter 300 and then reaches the exhaust gas filter 300, thereby causing heat damage to the exhaust gas filter 300.

Therefore, if the temperature of the exhaust gas reaches the high RPM escape temperature, the controller 100 controls the engine 500 to operate in a middle RPM range in which the RPM of the engine 500 is lower than the RPM of the engine 500 in the high RPM range and higher than the RPM of the engine 500 in the idle state.

The middle RPM range may have an RPM of the engine 500 which is set between the RPM of the engine 500 in the high RPM state and the RPM of the engine 500 in the idle state and may prevent a sudden reduction in the quantity of exhausted air, thus preventing an excessively high concentration of oxygen in the exhaust gas and overheating of the exhaust gas.

That is, by adjusting the RPM of the engine 500 from high RPM to middle RPM, the flow rate of exhaust gas is decreased, the consumption amount of oxygen in the exhaust gas is maintained to a designated level and the amount of exhaust gas is maintained to a designated level, thereby preventing oxygen in the exhaust gas from reaching an excessively high concentration. As the concentration of oxygen in exhaust gas increases, combustion may occur at a lower temperature, using less fuel.

Further, by adjusting the RPM of the engine 500 from high RPM to middle RPM, the flow rate of exhaust gas is maintained to a designated level and, thus, cooling effects caused by air flow of the engine 500 are maintained to some extent. Thereby, the temperature of the exhaust gas exhausted from the engine 500 may be lowered by the cooling effects.

Consequently, by controlling the engine 500 to operate in the middle RPM range, the excessively high concentration of oxygen in the exhaust gas and overheating of the exhaust gas may be prevented and a continuous occurrence of natural combustion reactions due to reaction of remaining fuel within the exhaust pipe with the exhaust gas of a high temperature and an excessively high concentration of oxygen, in order to rapidly raise the temperature of the exhaust gas when controlling the engine 500 to operate in the high RPM range (Operation S100), may be prevented. Thereby, heat damage to the exhaust gas filter 300 may be prevented.

Further, as exemplarily shown in FIG. 1, in secondary measurement (Operation S400), the temperature sensor unit 200 may measure the temperature of the exhaust gas and control the engine 500 to operate in the middle RPM range (Operation S300).

The temperature sensor unit 200 measures the temperature of the exhaust gas and controls the engine 500 to operate in the middle RPM range (Operation S300) and the controller 100 compares the measured temperature of the exhaust gas with a predetermined middle RPM escape temperature and judges the control state of the engine 500. If the measured temperature of the exhaust gas does not reach the middle RPM escape temperature and the exhaust gas maintains the high temperature state, the controller 100 may continue to control the engine 500 to operate in the middle RPM range so as to continuously lower the temperature of the exhaust gas.

Further, as exemplarily shown in FIG. 1, in controlling the engine 500 to operate in the idle state (Operation S500) of the present disclosure, if the temperature of the exhaust gas measured by the temperature sensor unit 200 in secondary measurement (Operation S400) is the middle RPM escape temperature predetermined by the controller 100 or lower, the controller 100 may control the engine 500 to operate in the idle state.

When the RPM of the engine 500 is suddenly changed from high RPM to low RPM, the exhaust gas reacts with remaining fuel within the exhaust pipe due to the excessively high concentration of oxygen in the exhaust gas and overheating of the exhaust gas and the temperature of the exhaust gas reaching the exhaust gas filter 300 is suddenly raised, as compared to the case that the engine 500 is maintained in the high RPM range, thus causing heat damage to the exhaust gas filter 300.

Therefore, the controller 100 maintains the engine 500 to operate in the middle RPM range so as to prevent undesired reactions with the fuel within the exhaust pipe and, when the temperature of the exhaust gas is lowered and then corresponds to the middle RPM escape temperature, controls the engine 500 to operate in the idle state.

The middle RPM escape temperature may be set based on the temperature of the exhaust gas in the middle RPM range, at which the exhaust gas does not react with the remaining fuel within the exhaust pipe even if the engine 500 is controlled to operate in the idle state so that the concentration of oxygen increases and the cooling effects of the engine 500 are reduced, and prevent a sudden rise of the temperature of the exhaust gas and heat damage to the exhaust gas filter 300.

Further, as exemplarily shown in FIG. 1, in the method for regenerating the exhaust gas filter 300 for vehicles in accordance with the embodiment of the present disclosure, in secondary measurement (Operation S400), the controller 100 may measure a maintenance time of control of the engine 500 to operate in the middle RPM range (Operation S300) and the temperature sensor unit 200 may measure the temperature of the exhaust gas.

In more detail, the maintenance time of control of the engine 500 to operate in the middle RPM range (Operation S300) is recorded by the controller 100 to control the engine 500. Judgment as to the concentration of oxygen in the exhaust gas or whether or not the exhaust gas escapes a reaction condition with the remaining fuel within the exhaust pipe only using the temperature of the exhaust gas may be sufficient in reliability.

Therefore, in addition to setting the temperature of the exhaust gas to control the engine 500 to operate in the middle RPM range (Operation S300), which is experimentally prepared to prevent a sudden rise of the temperature of the exhaust gas in various environments, the maintenance time of control of the engine 500 to operate in the middle RPM range (Operation S300) is judged so as to consider the minimal maintenance time of control of the engine 500 to operate in the middle RPM range (Operation S300), which is experimentally prepared, thereby improving reliability of the method for regenerating the exhaust gas filter 300.

Therefore, as exemplarily shown in FIG. 1, in the method for regenerating the exhaust gas filter 300 for vehicles in accordance with an embodiment of the present disclosure, when controlling the engine 500 to operate in the idle state (Operation S500), if the temperature of the exhaust gas measured by the temperature sensor unit 200 in secondary measurement (Operation S400) is the middle RPM escape temperature predetermined by the controller 110 or lower and the maintenance time of control of the engine 500 to operate in the middle RPM range (Operation S300) measured by the controller 100 is a middle RPM escape time predetermined by the controller 110 or more, the controller 100 may control the engine 500 to operate in the idle state.

As described above, the maintenance time of control of the engine 500 to operate in the middle RPM range (Operation S300) is recorded to provide reliability to the maintenance conditions of control of the engine 500 to operate in the middle RPM range (Operation S300) and, to control the engine 500 to operate in the idle state (Operation S500) only if both the middle RPM escape temperature and escape time, predetermined by the controller 100, are satisfied, the controller 100 controls the engine 500 to operate in the idle state.

Particularly, if, under the condition that only the middle RPM escape temperature is satisfied, regeneration of the exhaust gas is completed and the engine 500 is controlled to operate in the idle state, the concentration of oxygen in the exhaust gas increases enough to react the remaining fuel within the exhaust pipe and, thus, the exhaust gas may be overheated by combustion reactions with the remaining fuel.

Therefore, together with the middle RPM escape temperature, the middle RPM escape time is set and, even if the temperature of the exhaust gas is lower than the escape temperature, control of the engine 500 to operate in the middle RPM range (Operation S300) is maintained so that the state of the exhaust gas is stabilized to operate at a middle RPM. Then, only if the middle RPM escape time is satisfied also, the engine 500 is controlled to operate in the idle state. Thereby, unexpected heat damage to the exhaust gas filter 300 may be prevented and reliability of the regeneration method may be improved.

Further, in the method for regenerating the exhaust gas filter 300 for vehicles in accordance with the embodiment of the present disclosure, the high RPM range of the engine 500 may be the range of 1,200 RPM~1,500 RPM.

As a heating time of the exhaust gas to regenerate the exhaust gas filter 300 increases, fuel consumption caused by unnecessary output of the engine 500 increases and efficiency is decreased. Therefore, in order to rapidly raise the temperature of the exhaust gas, the RPM of the engine 500 is controlled to be lower than the high RPM range.

Here, setting the maximum output of the engine 500 as the high RPM range of the engine 500 burdens the engine 500 and increases fuel consumption, thus lowering efficiency. Therefore, the RPM of the engine 500 in the high RPM range may be set to an output lower than the maximum output of the engine 500 and, preferably, set to be in the range of 1,200 RPM~1,500 RPM so as to effectively raise the temperature of the exhaust gas.

Further, in the method for regenerating the exhaust gas filter 300 for vehicles in accordance with the embodiment of the present disclosure, the middle RPM range of the engine 500 may be the range of 650 RPM~1,200 RPM.

In general, if the engine 500 is in the idle state, the RPM of the engine 500 is in the range of 500 RPM~600 RPM. Therefore, the middle RPM range is set to the range of 650 RPM~1,200 RPM, which is the mean RPM of the engine 500 between the high RPM range in which the engine 500 is in the high power state, i.e., 1,200 RPM~1,500 RPM, and the RPM of the engine 500 in the idle state.

That is, by setting an intermediate range between the high RPM range and the idle state, generation of the excessively high concentration of oxygen in exhaust gas and overheating of the exhaust gas between controlling the engine 500 to operate in the high RPM range (Operation S100) and controlling the engine 500 to operate in the middle RPM range (Operation S300) may be prevented and, in order to prevent generation of the excessively high concentration of oxygen in exhaust gas and overheating of the exhaust gas between controlling the engine 500 to operate in the high RPM range (Operation S100) and controlling the engine 500 to operate in the middle RPM range (Operation S300), a range having the mean RPM of the engine 500 may be set as the middle RPM range, thus preventing heat damage to the exhaust gas filter 300 and improving reliability.

Further, as exemplarily shown in FIG. 1, in the method for regenerating the exhaust gas filter 300 for vehicles in accordance with the embodiment of the present disclosure, controlling the engine 500 to operate in the high RPM range (Operation S100), a fuel injection device 400 provided on an exhaust pipe between the exhaust gas filter 300 and the engine 500 may inject fuel into the exhaust pipe and thus raise the temperature of exhaust gas.

That is, when regeneration of the exhaust gas filter 300 is started, the controller 100 may inject fuel into the exhaust pipe using the fuel injection device 400 provided at one side of the exhaust pipe. Further, the fuel injection device 400 may inject fuel only to control the engine 500 to operate in the high RPM range (Operation S100) and may not inject fuel to control the engine 500 to operate in the middle RPM range (Operation S300) or control the engine 500 to operate in the idle state (Operation 500).

Therefore, fuel injected into the exhaust pipe is combusted using remaining oxygen in exhaust gas exhausted from the engine 500 and the high temperature of the exhaust gas is used to control the engine 500 to operate in the high RPM range (Operation S100) and thus the temperature of the exhaust gas is rapidly raised.

Accordingly, secondary combustion is carried out in the exhaust pipe, the temperature of the exhaust gas is suddenly raised, a time to reach the high RPM escape temperature at which foreign substances collected in the filter 300 may be naturally combusted is shortened, and the maintenance time of control of the engine 500 to operate in the high RPM range (Operation S100) is reduced, thereby, raising the operating efficiency of the engine 500 and reducing a fuel consumption rate.

Further, as exemplarily shown in FIG. 1, in the method for regenerating the exhaust gas filter 300 for vehicles in accordance with the embodiment of the present disclosure, in primary measurement (Operation S200) and secondary measurement (Operation S400), the temperature sensor unit 200 provided on an exhaust pipe between the fuel injection device 400 and the exhaust gas filter 300 may measure the temperature of exhaust gas.

In order to suddenly raise the temperature of the exhaust gas, the fuel injection device 400 may be provided at one side of the exhaust pipe. If the temperature sensor unit 200 is provided between the engine 500 and the fuel injection device 400 on the exhaust pipe, the temperature sensor unit 200 may not measure the raised temperature of the exhaust gas due to a combustion reaction within the exhaust pipe and may thus acquire a temperature lower than the temperature of the exhaust gas actually reaching the exhaust gas filter 300.

Therefore, if the temperature of the exhaust gas is raised using a secondary fuel combustion reaction within the exhaust pipe, the temperature sensor unit 200 is provided between the fuel injection device 400 and the exhaust gas filter 300 so as to accurately measure the temperature of the exhaust gas reaching the exhaust gas filter 300, thus raising reliability of the present disclosure.

As exemplarily shown in FIG. 2, a system for regenerating an exhaust gas filter 300 for vehicles in accordance with the present disclosure may include a temperature sensor unit 200 provided on an exhaust pipe between a vehicle engine 500 and the exhaust gas filter 300 to measure the temperature of exhaust gas, and a controller 100 to control the engine 500 to operate in a high RPM range and to regenerate the exhaust gas filter 300 due to a temperature rise of the exhaust gas, to control the engine 500 to operate in a middle RPM range to prevent the exhaust gas from overheating and oxygen from reaching an excessively high concentration if the temperature of the exhaust gas in the high RPM range is a high RPM escape temperature or higher, and to control the engine 500 to operate in an idle state if the temperature of the exhaust gas in the middle RPM range is a middle RPM escape temperature or lower.

In more detail, the temperature sensor unit 200 measures the temperature of the exhaust gas at one side of the exhaust pipe between the engine 500 and the exhaust gas filter 300, and the controller 100 controls the engine 500 to operate in the high RPM range, the middle RPM range or in the idle state so as to control a process for regenerating the exhaust gas filter 300. Further, the high RPM escape temperature and the middle RPM escape temperature are values which are predetermined by the controller 100 through experimentation.

In regeneration of the exhaust gas filter 300 for vehicles, the regeneration system of the present disclosure may be simply and effectively used, thus preventing heat damage to the exhaust gas filter 300 and improving reliability.

As is apparent from the above description, a method for regenerating an exhaust gas filter for vehicles and a system therefor in accordance with the present disclosure may prevent heat damage to the exhaust gas filter due to a rise of the temperature of exhaust gas and improve reliability of regeneration of the exhaust gas filter.

Particularly, after regeneration of the exhaust gas filter using the high RPM range of an engine, the engine may be controlled to operate in a middle RPM range, thus suppressing generation of an excessively high concentration of oxygen in the exhaust gas and suppressing reactions with remaining fuel within an exhaust pipe. Further, cooling effects by the exhaust gas may be maintained, thus preventing a rise of the temperature of the exhaust gas.

Simultaneously, a maintenance time of operation of the engine in the middle RPM range is measured and operation of the engine in the middle RPM range is maintained so as to prevent a rise of the temperature of the exhaust gas, thus simply and effectively improving reliability of regeneration of the exhaust gas filter.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method for regenerating an exhaust gas filter for vehicles, comprising:
   an engine to operate controlling in a high RPM range by a vehicle ECU and regenerating the exhaust gas filter due to a temperature rise of an exhaust gas;
   primarily measuring the temperature of the exhaust gas by a temperature sensor unit provided on an exhaust pipe, in a primary measurement, while the engine is operating in the high RPM range;
   controlling the engine to operate in a middle RPM range by the vehicle ECU to prevent the exhaust gas from overheating and oxygen from reaching an excessively high concentration, when the temperature of the exhaust gas measured by the temperature sensor unit in the primary measurement is a high RPM escape temperature predetermined by the vehicle ECU or higher;
   secondarily measuring the temperature of the exhaust gas by the temperature sensor unit, in a secondary measurement, while the engine is operating in the middle RPM range; and
   controlling the engine to operate in an idle state when the temperature of the exhaust gas measured by the temperature sensor unit in secondary measurement is a middle RPM escape temperature predetermined by the vehicle ECU or lower,
   wherein the middle RPM range has an RPM of the engine which is set between the RPM of the engine in a high RPM state and the RPM of the engine in the idle state.

2. The method according to claim 1, wherein, in the step of the secondary measurement, the vehicle ECU measures a maintenance time of control of the engine to operate in the middle RPM range and the temperature sensor unit measures the temperature of the exhaust gas.

3. The method according to claim 2, wherein, in the step of controlling the engine to operate in the idle state, when the temperature of the exhaust gas measured by the temperature sensor unit in secondary measurement is the middle RPM escape temperature predetermined by the vehicle ECU or lower, and the maintenance time of control of the engine to operate in the middle RPM range measured by the vehicle ECU is a middle RPM escape time predetermined by the vehicle ECU or more, the vehicle ECU controls the engine to operate in the idle state.

4. The method according to claim 1, wherein the high RPM range of the engine is the range of 1,200 RPM~1,500 RPM.

5. The method according to claim 1, wherein the middle RPM range of the engine is the range of 650 RPM~1,200 RPM.

6. The method according to claim 1, wherein, in the step of controlling the engine to operate in the high RPM range, a fuel injection device provided on an exhaust pipe between the exhaust gas filter and the engine injects fuel into the exhaust pipe to raise the temperature of the exhaust gas.

7. The method according to claim 6, wherein, in the steps of primary measurement and secondary measurement, the temperature sensor unit provided on an exhaust pipe between the fuel injection device and the exhaust gas filter measures the temperature of the exhaust gas.

8. A method of regenerating an exhaust gas filter for vehicles, comprising:
controlling an engine to operate in a high RPM range and regenerating the exhaust gas filter due to a temperature rise of an exhaust gas;
primarily measuring the temperature of the exhaust gas, while the engine is operating in the high RPM range;
controlling the engine to operate in a middle RPM range to prevent the exhaust gas from overheating and oxygen from reaching an excessively high concentration, when the temperature of the exhaust gas measured in primary measurement is a high RPM escape temperature or higher;
secondarily measuring the temperature of the exhaust gas, while the engine is operating in the middle RPM range; and
controlling the engine to operate in an idle state, when the temperature of the exhaust gas measured in secondary measurement is a middle RPM escape temperature or lower,
wherein the middle RPM range has an RPM of the engine which is set between the RPM of the engine in a high RPM state and the RPM of the engine in the idle state.

9. A system for regenerating an exhaust gas filter for vehicles, comprising:
a temperature sensor unit provided on an exhaust pipe between a vehicle engine and the exhaust gas filter to measure the temperature of exhaust gas; and
a vehicle ECU for controlling the engine to operate in a high RPM range and to regenerate the exhaust gas filter due to a temperature rise of the exhaust gas, for controlling the engine to operate in a middle RPM range to prevent the exhaust gas from overheating and oxygen from reaching an excessively high concentration when the temperature of the exhaust gas in the high RPM range is a high RPM escape temperature or higher, and for controlling the engine to operate in an idle state when the temperature of the exhaust gas in the middle RPM range is a middle RPM escape temperature or lower,
wherein the middle RPM range has an RPM of the engine which is set between the RPM of the engine in a high RPM state and the RPM of the engine in the idle state.

* * * * *